US008270275B2

(12) United States Patent
Nishida

(10) Patent No.: US 8,270,275 B2
(45) Date of Patent: Sep. 18, 2012

(54) INFORMATION PROCESSING DEVICE, DISC, INFORMATION PROCESSING METHOD, AND PROGRAM

(75) Inventor: Ryusuke Nishida, Kanagawa (JP)

(73) Assignee: Sony Corporation, Tokyo (JP)

( * ) Notice: Subject to any disclaimer, the term of this patent is extended or adjusted under 35 U.S.C. 154(b) by 774 days.

(21) Appl. No.: 12/271,442

(22) Filed: Nov. 14, 2008

(65) Prior Publication Data

US 2009/0154314 A1    Jun. 18, 2009

(30) Foreign Application Priority Data

Dec. 14, 2007    (JP) ................................. 2007-323510

(51) Int. Cl.
*G11B 7/00*    (2006.01)

(52) U.S. Cl. ....................................... 369/53.21; 726/26

(58) Field of Classification Search ............... 369/53.21, 369/47.12; 386/252–260; 360/15, 60; 726/26
See application file for complete search history.

(56) References Cited

U.S. PATENT DOCUMENTS

| | | | |
|---|---|---|---|
| 6,665,489 | B2 | 12/2003 | Collart |
| 6,937,553 | B1 | 8/2005 | Mitui et al. |
| 2002/0049678 | A1* | 4/2002 | Oshima et al. .................. 705/51 |
| 2003/0133702 | A1* | 7/2003 | Collart .......................... 386/125 |
| 2004/0165494 | A1* | 8/2004 | Suh et al. .................... 369/47.12 |
| 2005/0081047 | A1* | 4/2005 | Kitani ........................... 713/193 |
| 2005/0213234 | A1* | 9/2005 | Senshu et al. ................... 360/15 |
| 2006/0092799 | A1* | 5/2006 | Lee et al. ..................... 369/53.22 |
| 2007/0011746 | A1 | 1/2007 | Malpani et al. |
| 2007/0083726 | A1* | 4/2007 | Newton et al. ................. 711/170 |
| 2007/0286575 | A1* | 12/2007 | Oashi et al. ...................... 386/95 |

FOREIGN PATENT DOCUMENTS

| | | |
|---|---|---|
| EP | 1 586 988 A2 | 10/2005 |
| JP | 11-215452 | 8/1999 |
| JP | 2000-251395 | 9/2000 |
| JP | 2000-330870 A | 11/2000 |
| JP | 2001-216148 A | 8/2001 |
| JP | 2002-073196 A | 3/2002 |
| JP | 2003-337629 A | 11/2003 |
| JP | 2006-004376 A | 1/2006 |
| JP | 2007-226277 A | 9/2007 |
| WO | WO 2005/036404 A2 | 4/2005 |

(Continued)

OTHER PUBLICATIONS

"Advanced Access Content System (AACS)",Blu-Ray Disc Pre-Recorded Book, XP-007900016, Revision 0.91, Feb. 17, 2006, 88 pages.

(Continued)

*Primary Examiner* — Thomas Alunkal
(74) *Attorney, Agent, or Firm* — Oblon, Spivak, McClelland, Maier & Neustadt, L.L.P.

(57) ABSTRACT

An information processing device that uses contents recorded in a disc includes: an application execution unit that executes an application, which is a program for utilizing the contents recorded in the disc; and a BCA driver execution unit that executes a BCA driver, which is a program for instructing a drive device to execute a process of reading a media ID recorded in a BCA (Burst Cutting Area) area of the disc, wherein the BCA driver execution unit, in response to a first API (Application Programming Interface) call from the application execution unit, executes a process of providing the application execution unit with a pointer to a second API for executing a process of reading a media ID.

20 Claims, 12 Drawing Sheets

FOREIGN PATENT DOCUMENTS

WO    WO 2007/023420 A1    3/2007

OTHER PUBLICATIONS

SFF Committee, "Mt. Fuji Commands for Multimedia Devices Version 7 Revision 0.9", AACS Content Protection, XP-002504601, Jul. 25, 2007, pp. 457-460.

"Advanced Access Content System (AACS)", HD DVD and DVD Pre-Recorded Book, XP-002468445, Revision 0.912, Aug. 15, 2006, 166 pages.

Office Action issued Mar. 27, 2012 in Japanese Patent Application No. 2007-323510 filed Dec. 14, 2007.

* cited by examiner

FIG. 11

```
-Declaration
    Typedef struct _FUNC_PTR{
            PVOID Dummy1[n];        ← DUMMY POINTER
            PVOID pGetBCAID;        ← RIGHT POINTER
            PVOID Dummy2[n'];       ← DUMMY POINTER
    } FUNC_PTR, *PFUNC_PTR
```

INFORMATION PROCESSING DEVICE, DISC, INFORMATION PROCESSING METHOD, AND PROGRAM

CROSS REFERENCES TO RELATED APPLICATIONS

The present invention contains subject matter related to Japanese Patent Application JP 2007-323510 filed in the Japanese Patent Office on Dec. 14, 2007, the entire contents of which are incorporated herein by reference.

BACKGROUND OF THE INVENTION

1. Field of the Invention

The present invention relates to an information processing device, a disc, an information processing method, and a program. More specifically, the invention relates to an information processing device, a disc, an information processing method, and a program that control access to the contents stored in an information recording medium.

2. Description of the Related Art

Discs, such as a DVD (Digital Versatile Disc) and a Blu-ray Disc (registered trademark), are used as contents recording media. For example, movie contents, and the like, are recorded in discs (for example, ROM discs) and provided for users. These disc recorded contents are mostly the contents whose copyright, distribution right, and the like, are owned by the creators or distributors. These contents are subjected to access control for preventing, for example, unauthorized copy (replication), and the like.

One of standards for contents copyright protection is AACS (Advanced Access Content System). AACS defines a copyright protection technology based on an advanced common key cryptography (AES cryptography). In the definition of the AACS, when a contents access process, such as, reproduction of contents from a disc or a contents copy recording process, is executed, it may be necessary to read identification information recorded in the disc, for example, PMSN (Pre-recorded Media Serial Number) which is disc unique identification information (media ID), and execute a process, such as authentication process or cryptography process, in accordance with a sequence defined in the AACS. For a contents storage disc according to the AACS definition, PMSN, which is disc unique identification information, is recorded in a BCA (Burst Cutting Area) of the disc.

The BCA area is different from a normal data recording area, and data are recorded by mechanical cutting, which is different from a normal data recording mode. Thus, it is difficult to rewrite recording data in the BCA area. In the reproducing process as well, a special reading process different from the normal data reproducing process may be necessary.

FIG. 1 is a view that illustrates recording data in a disc (information recording medium) 100 in which contents are recorded. The disc 100 is, for example, a DVD (Digital Versatile Disc), a Blu-ray Disc (registered trademark), or the like, and contents, such as a movie, are recorded in a data recording area.

The disc 100 includes the data recording area 110 in which contents, or the like, are recorded, and a BCA area (burst cutting area) 120 in which a media ID (for example, PMSN: Pre-recorded Media Serial Number) 121, which is disc unique identification information, is recorded.

For example, the following data are recorded in the data recording area 110 of the disc 100. The recorded data, for example, include contents 111 such as a movie, an application 112 which is a program applied to execute contents access control, such as a process of reproducing or copying the contents, and a BCA driver 113 which is a program for executing a process of reading a media ID from the BCA area 120. Note that the BCA driver 113 executes an authentication process with a drive device that reads data from the disc to thereby verify the validity of the drive device, and only when the validity of the drive device is verified, instructs the drive device to read the media ID (PMSN). The BCA driver contains a secret key 114 that is utilized in the authentication process.

A media ID (PMSN) 121, which is disc unique identification information, is recorded in the BCA area 120 of the disc 100. As described above, the BCA area is different from the normal data recording area, and data are recorded by mechanical cutting, which is different from a normal data recording mode. Thus, it is difficult to rewrite recording data in the BCA area. In the reproducing process as well, a special reading process different from the normal data reproducing process may be necessary.

According to one definition of the AACS, when the contents 111 recorded in the disc recording area 110 are copied to another media, such as a hard disk or a portable device, it may be necessary to acquire copy permission information from an external management server. To acquire the copy permission information, it may be necessary to transmit the media ID 121 to the management server.

However, the process of reaching the media ID 121 from the BCA area 120 may be executed only by the BCA driver 113 that complies with the AACS definition. The BCA driver 113 executes mutual authentication with the drive device loaded with the disc 100 in accordance with the AACS definition, verifies the validity of both the drive device and the BCA driver, reads the media ID 121, and then provides the acquired media ID to the application.

An example of this process sequence will be described with reference to FIG. 2. FIG. 2 shows the application 112 and the BCA driver 113. An information processing device, such as a PC or a reproducing device, that reproduces a disc reads and executes the application 112 and the BCA driver 113 from the disc 100.

Note that the BCA driver 113 is a program that is generated in accordance with the AACS definition, and executes an authentication process according to the AACS definition and reading of a media ID from the BCA area. On the other hand, the application 112 is a program that may be created by a third party at will. Thus, the application 112 may possibly be a malicious program, such as a program that is generated to fraudulently acquire media ID information.

The application 112 calls an API (Application Programming Interface) from the BCA driver 113. The API includes functions for requesting the BCA driver to acquire a media ID. The API is public and is available to a third party.

The BCA driver 113, in step S11, in response to the API call from the application 112, initiates a series of processes for the process of providing a media ID. First, in step S12, the BCA driver 113 executes an authentication process with the drive device that reads data from the disc to check the validity of both the drive device and the BCA driver. The authentication process is executed in accordance with the AACS definition.

In step S13, when it is not authenticated and the validity of both is not verified, an error notification is transmitted to the application 112, and the process ends without reading a media ID.

On the other hand, in step S13, when it is authenticated and the validity of both is verified, in step S14, the drive device is instructed to read a media ID from the BCA area, and the read media ID is provided to the application 112.

After that, the application 112 transmits the media ID acquired from the BCA driver 113 to the management server, and then receives contents copy permission information or other service information.

In the above series of processes, there is a problem that the application 112 is a program that may be created by a third party at will, and it may possibly be a malicious program, such as a program that is generated to fraudulently acquire media ID information. In the sequence shown in FIG. 2, even when a malicious application is used, it is easy to acquire a media ID from the BCA driver using the public API. Thus, there is a possibility that a media ID may be fraudulently acquired or contents may be fraudulently used using the fraudulently acquired media ID.

SUMMARY OF THE INVENTION

There is a need for providing an information processing device, a disc, an information processing method, and a program that prevent a media ID of a disc from being fraudulently acquired and that implement strict access control to contents.

According to a first embodiment of the invention, an information processing device that uses contents recorded in a disc includes: an application execution unit that executes an application, which is a program for utilizing the contents recorded in the disc; and a BCA driver execution unit that executes a BCA driver, which is a program for instructing a drive device to execute a process of reading a media ID recorded in a BCA (Burst Cutting Area) area of the disc, wherein the BCA driver execution unit, in response to a first API (Application Programming Interface) call from the application execution unit, executes a tampering check process on the BCA driver, and, when it is verified that there is no tampering in the BCA driver, executes a process of providing the application execution unit with a pointer to a second API for executing a process of reading a media ID.

In the information processing device according to one embodiment of the invention, the first API is a public API that is public to a third party, and the second API is a private API that is not public to the third party.

In the information processing device according to one embodiment of the invention, the BCA driver execution unit, in response to a second API call from the application, executes an authentication process with the drive device, and when it is verified that the mutual validity of the BCA driver and the drive device, instructs the drive device to read the media ID.

In the information processing device according to one embodiment of the invention, the BCA driver execution unit, in response to a second API call from the application, executes a tampering check process on the BCA driver, and when it is verified that there is no tampering in the BCA driver, executes an authentication process with the drive device.

In the information processing device according to one embodiment of the invention, the BCA driver execution unit executes a tampering check process on the BCA driver each time the BCA driver executes a step.

In the information processing device according to one embodiment of the invention, the BCA driver execution unit executes a process of providing the application execution unit with data mixing a pointer to the second API and a dummy pointer.

In the information processing device according to one embodiment of the invention, the application and the BCA driver are recorded in the disc, and the application execution unit and the BCA driver execution unit respectively read and execute the application and the BCA driver recorded in the disc.

According to a second embodiment of the invention, an information processing device that utilizes contents recorded in a disc includes: an application execution unit that executes an application, which is a program for utilizing the contents recorded in the disc; and a BCA driver execution unit that executes a BCA driver, which is a program for instructing a drive device to execute a process of reading a media ID recorded in a BCA (Burst Cutting Area) area of the disc, wherein the BCA driver includes tampering check data, wherein the BCA driver execution unit, in response to a first API (Application Programming Interface) call from the application execution unit, executes a tampering check process on the BCA driver by applying the tampering check data, and, when it is verified that there is no tampering in the BCA driver, executes a process of providing the application execution unit with a pointer to a second API for executing a process of reading a media ID.

According to a third embodiment of the invention, an information processing device that utilizes contents recorded in a disc includes: an application execution unit that executes an application, which is a program for utilizing the contents recorded in the disc; and a BCA driver execution unit that executes a BCA driver, which is a program for instructing a drive device to execute a process of reading a media ID recorded in a BCA (Burst Cutting Area) area of the disc, wherein the BCA driver includes checksum data, as tampering check data, that are obtained by adding numeric values of data that constitute the BCA driver in predetermined units of data, wherein the BCA driver execution unit, in response to a first API (Application Programming Interface) call from the application execution unit, executes a tampering check process on the BCA driver by applying the checksum data, and, when it is verified that there is no tampering in the BCA driver, executes a process of providing the application execution unit with a pointer to a second API for executing a process of reading a media ID.

According to a fourth embodiment of the invention, an information processing device that utilizes contents recorded in a disc includes: an application execution unit that executes an application, which is a program for utilizing the contents recorded in the disc; and a BCA driver execution unit that executes a BCA driver, which is a program for instructing a drive device to execute a process of reading a media ID recorded in a BCA (Burst Cutting Area) area of the disc, wherein the BCA driver includes tampering check data and a hash value for the tampering check data, wherein the BCA driver execution unit, in response to a first API (Application Programming Interface) call from the application execution unit, executes a tampering check process on the BCA driver by applying the tampering check data and executes a tampering check process on the tampering check data by applying the hash value, and, when it is verified that there is no tampering in the BCA driver and that there is no tampering in the tampering check data, executes a process of providing the application execution unit with a pointer to a second API for executing a process of reading a media ID.

According to a fifth embodiment of the invention, an information processing device that uses contents recorded in a disc includes: an application execution unit that executes an application, which is a program for utilizing the contents recorded in the disc; and a BCA driver execution unit that executes a BCA driver, which is a program for instructing a drive device to execute a process of reading a media ID recorded in a BCA (Burst Cutting Area) area of the disc, wherein the BCA driver execution unit, in response to a first API (Application Programming Interface) call from the application execution unit, executes a process of providing the application execution unit with a pointer to a second API for executing a process of reading a media ID.

According to a sixth embodiment of the invention, a disc contains: contents; an application which is a program for utilizing the contents; a media ID recorded in a BCA (Burst Cutting Area) area provided in the disc; and a BCA driver that includes a program for instructing a drive device to execute a process of reading the media ID, tampering check data for the program, and an API to which the application is accessible, wherein in an information processing device that utilizes the contents, the BCA driver, in response to a first API (Application Programming Interface) call from the application, executes tampering check on the BCA driver to which the tampering check data are applied, and when it is verified that there is no tampering, executes a process of providing the application with a pointer to a second API for executing reading of the media ID.

In the disc according to one embodiment of the invention, the first API is a public API that is public to a third party, and the second API is a private API that is not public to the third party.

According to a seventh embodiment of the invention, an information processing method executed in an information processing device that utilizes contents recorded in a disc includes the steps of: executing an application, which is a program for utilizing the contents recorded in the disc, by an application execution unit; and executing a BCA driver, which is a program for instructing a drive device to execute a process of reading a media ID recorded in a BCA (Burst Cutting Area) area provided in the disc, by an BCA driver execution unit, wherein when the BCA driver is executed, in response to a first API (Application Programming Interface) call from the application execution unit, a tampering check process is executed on the BCA driver, and wherein when it is verified that there is no tampering in the BCA driver, a process of providing the application execution unit with a pointer to a second API for executing a process of reading the media ID is executed.

In the information processing method according to one embodiment of the invention, the first API is a public API that is public to a third party, and the second API is a private API that is not public to the third party.

In the information processing method according to one embodiment of the invention, when the BCA driver is executed, in response to a second API call from the application, an authentication process is executed with the drive device, and when it is verified that the mutual validity of the BCA driver and the drive device, the drive device is instructed to read the media ID.

In the information processing method according to one embodiment of the invention, when the BCA driver is executed, in response to a second API call from the application, a tampering check process is executed on the BCA driver, and when it is verified that there is no tampering in the BCA driver, an authentication process is executed with the drive device.

In the information processing method according to one embodiment of the invention, when the BCA driver is executed, a tampering check process is executed on the BCA driver each time the BCA driver executes a step.

In the information processing method according to one embodiment of the invention, when the BCA driver is executed, a process of providing the application execution unit with data mixing a pointer to the second API and a dummy pointer is executed.

According to an eighth embodiment of the invention, an information processing method that is executed in an information processing device that utilizes contents recorded in a disc includes the steps of: executing an application, which is a program for utilizing the contents recorded in the disc, by an application execution unit; and executing a BCA driver, which is a program for instructing a drive device to execute a process of reading a media ID recorded in a BCA (Burst Cutting Area) area of the disc, by a BCA driver execution unit, wherein the BCA driver includes tampering check data, wherein when the BCA driver is executed, in response to a first API (Application Programming Interface) call from the application execution unit, a tampering check process is executed on the BCA driver by applying the tampering check data, and, when it is verified that there is no tampering in the BCA driver, a process of providing the application execution unit with a pointer to a second API for executing a process of reading a media ID is executed.

According to a ninth embodiment of the invention, an information processing method that is executed in an information processing device that utilizes contents recorded in a disc includes the steps of: executing an application, which is a program for utilizing the contents recorded in the disc, by an application execution unit; and executing a BCA driver, which is a program for instructing a drive device to execute a process of reading a media ID recorded in a BCA (Burst Cutting Area) area of the disc, by a BCA driver execution unit, wherein the BCA driver includes checksum data, as tampering check data, that are obtained by adding numeric values of data that constitute the BCA driver in predetermined units of data, wherein when the BCA driver is executed, in response to a first API (Application Programming Interface) call from the application execution unit, a tampering check process is executed on the BCA driver by applying the checksum data, and, when it is verified that there is no tampering in the BCA driver, a process of providing the application execution unit with a pointer to a second API for executing a process of reading a media ID is executed.

According to a tenth embodiment of the invention, an information processing method that is executed in an information processing device that utilizes contents recorded in a disc includes the steps of: executing an application, which is a program for utilizing the contents recorded in the disc, by an application execution unit; and executing a BCA driver, which is a program for instructing a drive device to execute a process of reading a media ID recorded in a BCA (Burst Cutting Area) area of the disc, by a BCA driver execution unit, wherein the BCA driver includes tampering check data and a hash value for the tampering check data, wherein when the BCA driver is executed, in response to a first API (Application Programming Interface) call from the application execution unit, a tampering check process is executed on the BCA driver by applying the tampering check data and a tampering check process is executed on the tampering check data by applying the hash value, and, when it is verified that there is no tampering in the BCA driver and that there is no tampering in the tampering check data, a process of providing the application execution unit with a pointer to a second API for executing a process of reading a media ID is executed.

According to an eleventh embodiment of the invention, an information processing method that is executed in an information processing device that uses contents recorded in a disc includes the steps of: executing an application, which is a program for utilizing the contents recorded in the disc, by an application execution unit; and executing a BCA driver, which is a program for instructing a drive device to execute a process of reading a media ID recorded in a BCA (Burst Cutting Area) area of the disc, by a BCA driver execution unit, wherein when the BCA driver is executed, in response to a first API (Application Programming Interface) call from the application execution unit, a process of providing the application execution unit with a pointer to a second API for executing a process of reading a media ID is executed.

According to a twelfth embodiment of the invention, a program for executing information processing in an information processing device that utilizes contents recorded in a disc includes the steps of: executing an application, which is a program for utilizing the contents recorded in the disc, by an application execution unit; and executing a BCA driver, which is a program for instructing a drive device to execute a process of reading a media ID recorded in a BCA (Burst Cutting Area) area provided in the disc, by an BCA driver execution unit, wherein when the BCA driver is executed, in response to a first API (Application Programming Interface) call from the application execution unit, a tampering check process is executed on the BCA driver, and when it is verified that there is no tampering in the BCA driver, a process of providing the application execution unit with a pointer to a second API for executing a process of reading the media ID is executed.

Note that the program according to the embodiments of the invention may be, for example, provided to a general-purpose system that is able to execute various program codes in a computer readable format through a recording medium or a communication medium. By providing the above programs in a computer readable format, processes in accordance with the programs may be implemented on a computer system.

Further aspects, features and advantages of the invention will become apparent from further detailed description based on embodiments of the invention and the accompanying drawings. Note that the system in the present specification is a logically integrated configuration of a plurality of devices, and is not limited to the one that a device of each configuration is placed in the same casing.

BRIEF DESCRIPTION OF THE DRAWINGS

FIG. 11 is a view that illustrates an example of data mixing a private API pointer and dummy pointers, which are provided from the BCA driver to the application.

DESCRIPTION OF THE PREFERRED EMBODIMENTS

Hereinafter, an information processing device, a disc, an information processing method and a program according to an embodiment of the invention will be described in greater detail with reference to the accompanying drawings.

Figure 1:
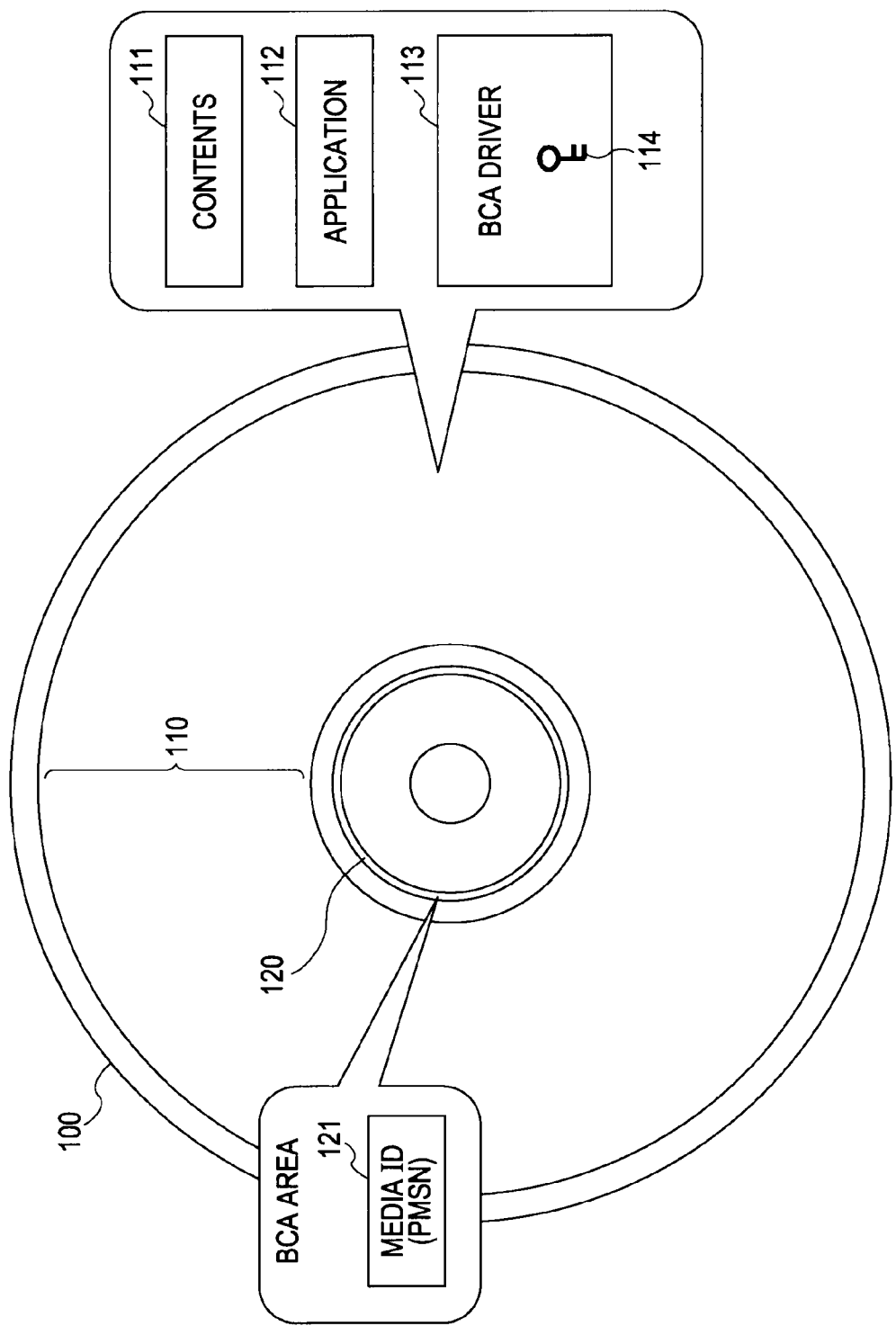
FIG. 1 is a view that illustrates an example of data recorded in a disc.
Figure 2:
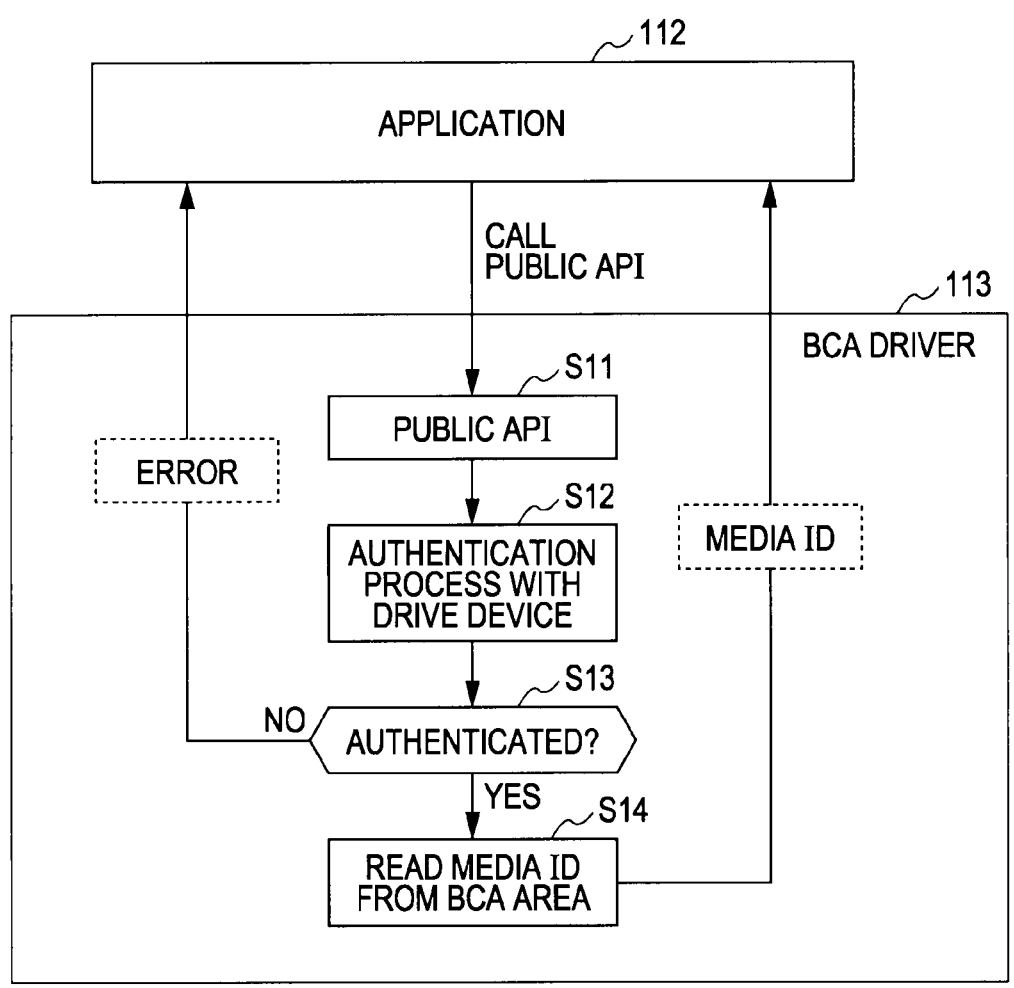
FIG. 2 is a view that illustrates a sequence in which a media ID recorded in the disc is read.
Figure 3:
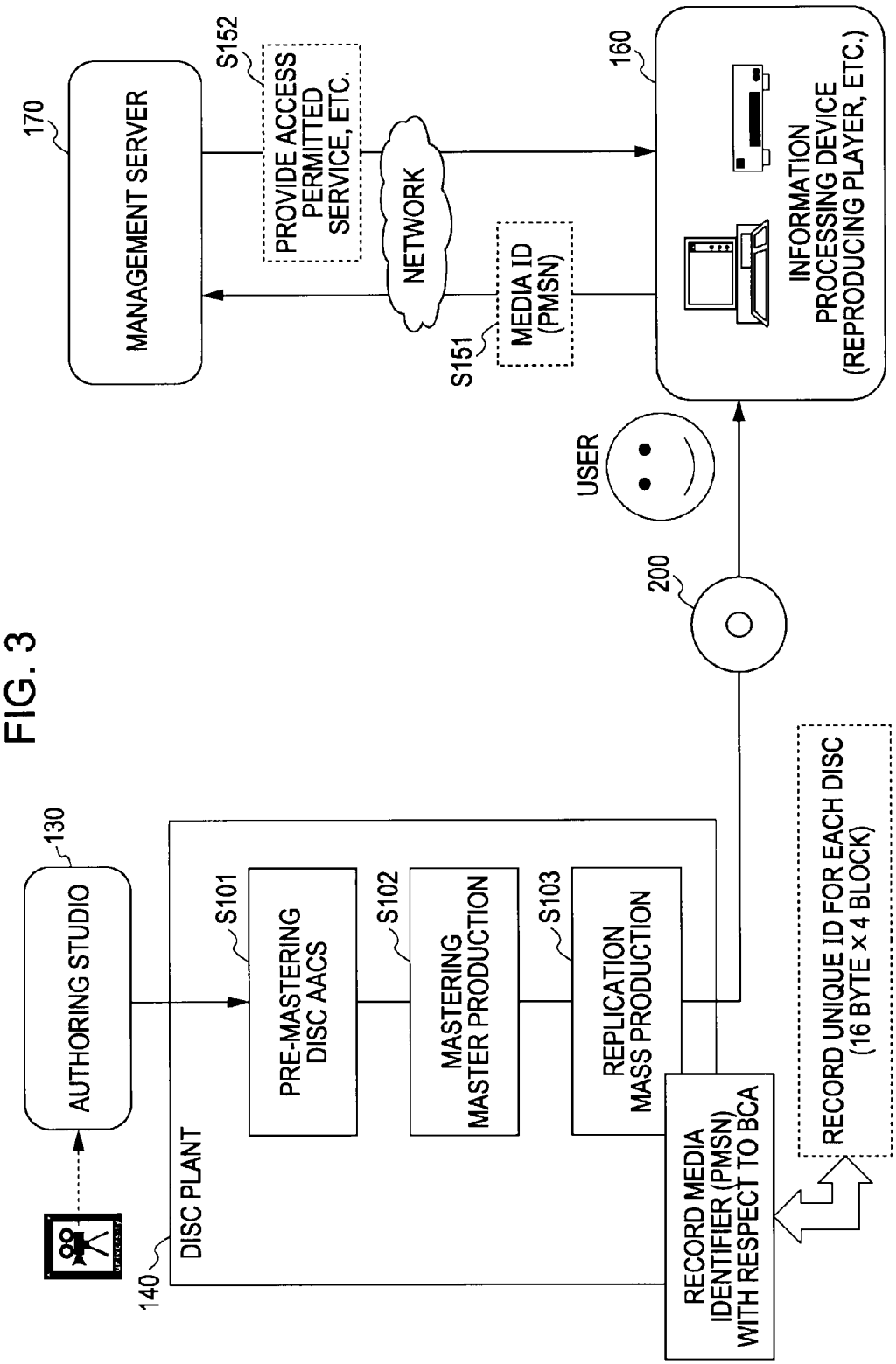
FIG. 3 is a view that illustrates an overview of a process of manufacturing the disc and a process of accessing the disc.

First, an overview of manufacturing of a disc, in which a media ID (PMSN: Pre-recorded Media Serial Number), which is a disc unique identification information, is recorded, and access processing will be described with reference to FIG. 3.

Contents, such as a movie, to be recorded in a disc are initially created as authoring contents for disc recording in an authoring studio 130. After that, in a disc plant 140, a pre-mastering process (S101), which is a process of generating data for disc recording, such as a contents cryptography process according to the AACS definition, is executed. Then, a mastering process (S102), which is a master producing process based on data recorded in a disc, is performed, and a large number of discs are produced using the produced master, that is, a replication process (S103) is executed.

When discs are produced through the replication process, identification information that is unique to each disc, that is, a media ID (PMSN), is recorded in the BCA area of each disc. For example, a media ID formed of 16 bytes×4 blocks, that is, 64 byte data, is recorded in the BCA area of each disc.

As described above, the BCA area is different from the normal data recording area, and data are recorded by mechanical cutting, which is different from a normal data recording mode. Thus, it is difficult to rewrite recording data in the BCA area. In the reproducing process as well, a special reading process different from the normal data reproducing process may be necessary.

The disc 200 produced as in the above manner is purchased by the user, set in an information processing device 160, such as user's PC or reproducing device, and subjected to contents access processing, such as reproducing contents or copying contents. For copying contents, it may be necessary that the media ID recorded in the disc is transmitted to a management server 170 (S151) and access permission information, such as copy permission information, is acquired from the management server 170 (S152). In addition, when another service is received from the management server 170 as well, it may be requested to transmit the media ID to the management server 170.

Figure 4:
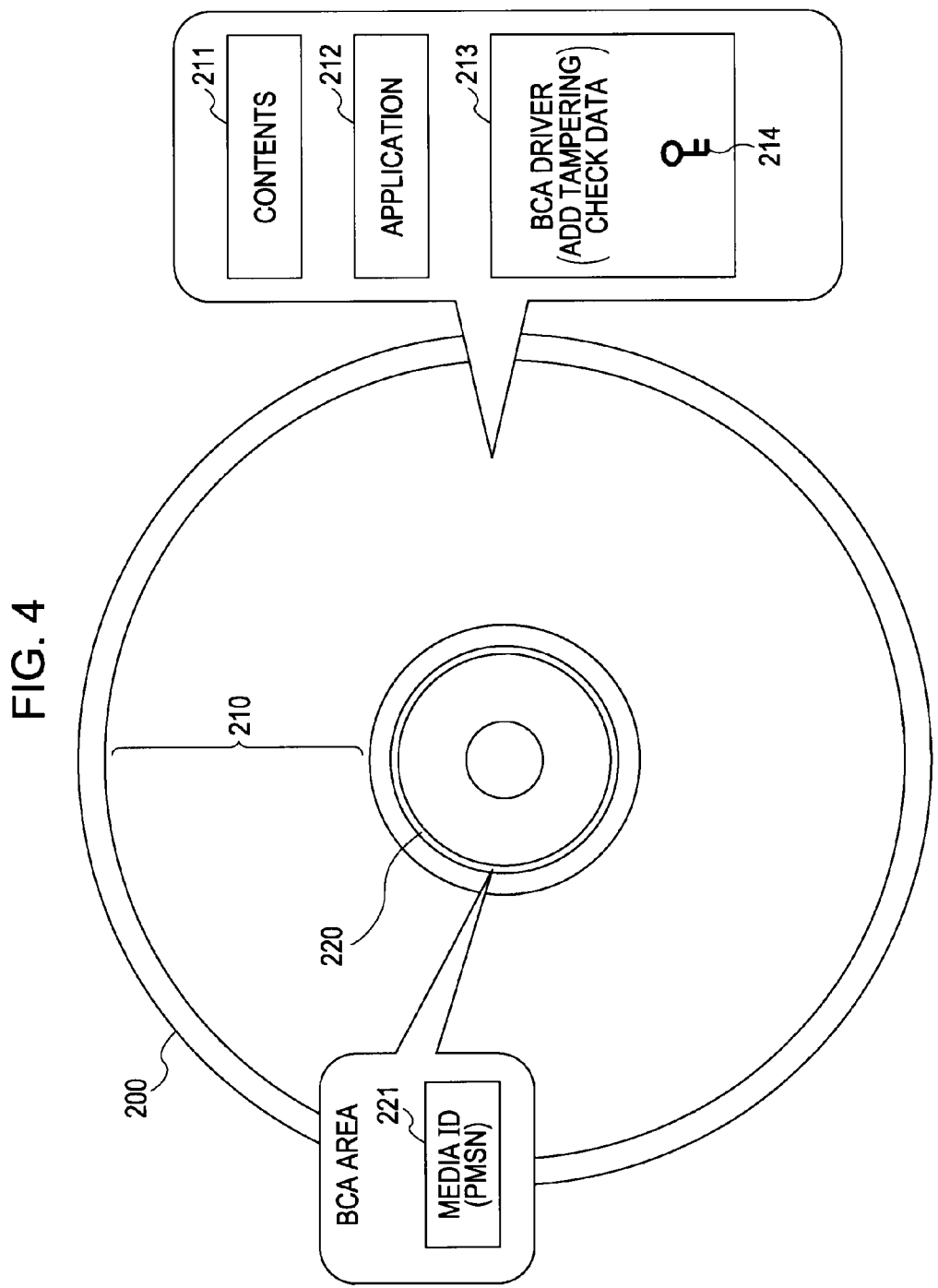
FIG. 4 is a view that illustrates an example of data recorded in the disc according to an embodiment of the invention.

An example of a configuration of the disc according to the embodiment of the invention will be described with reference to FIG. 4. FIG. 4 is a view that illustrates data recorded in the disc (information recording medium) 200 in which contents are recorded. The disc 200 is, for example, a DVD (Digital Versatile Disc), a Blu-ray Disc (registered trademark), or the like, and contents, such as a movie, are recorded in a data recording area.

The disc 200 includes the data recording area 210 in which contents, or the like, are recorded, and a BCA area (burst cutting area) 220 in which a media ID (for example, PMSN:

Pre-recorded Media Serial Number) 221, which is disc unique identification information, is recorded.

For example, the following data are recorded in the data recording area 210 of the disc 200. The recorded data, for example, include contents 211 such as a movie, an application 212 which is a program applied to execute contents access control, such as a process of reproducing or copying the contents, and a BCA driver 213 which is a program for executing a process of reading a media ID from the BCA area 220. Note that the BCA driver 213 executes an authentication process with a drive device that reads data from the disc to thereby check the validity of the drive device, and only when the validity of the drive device is verified, instructs the drive device to read the media ID (PMSN). The BCA driver contains a secret key 214 that is utilized in the authentication process. Note that tampering check data are added to the BCA driver 213 recorded in the disc 200 according to the embodiment of the invention. The process of accessing the data will be described later.

Furthermore, a media ID (PMSN) 221, which is disc unique identification information, is recorded in the BCA area 220 of the disc 200.

Figure 5:
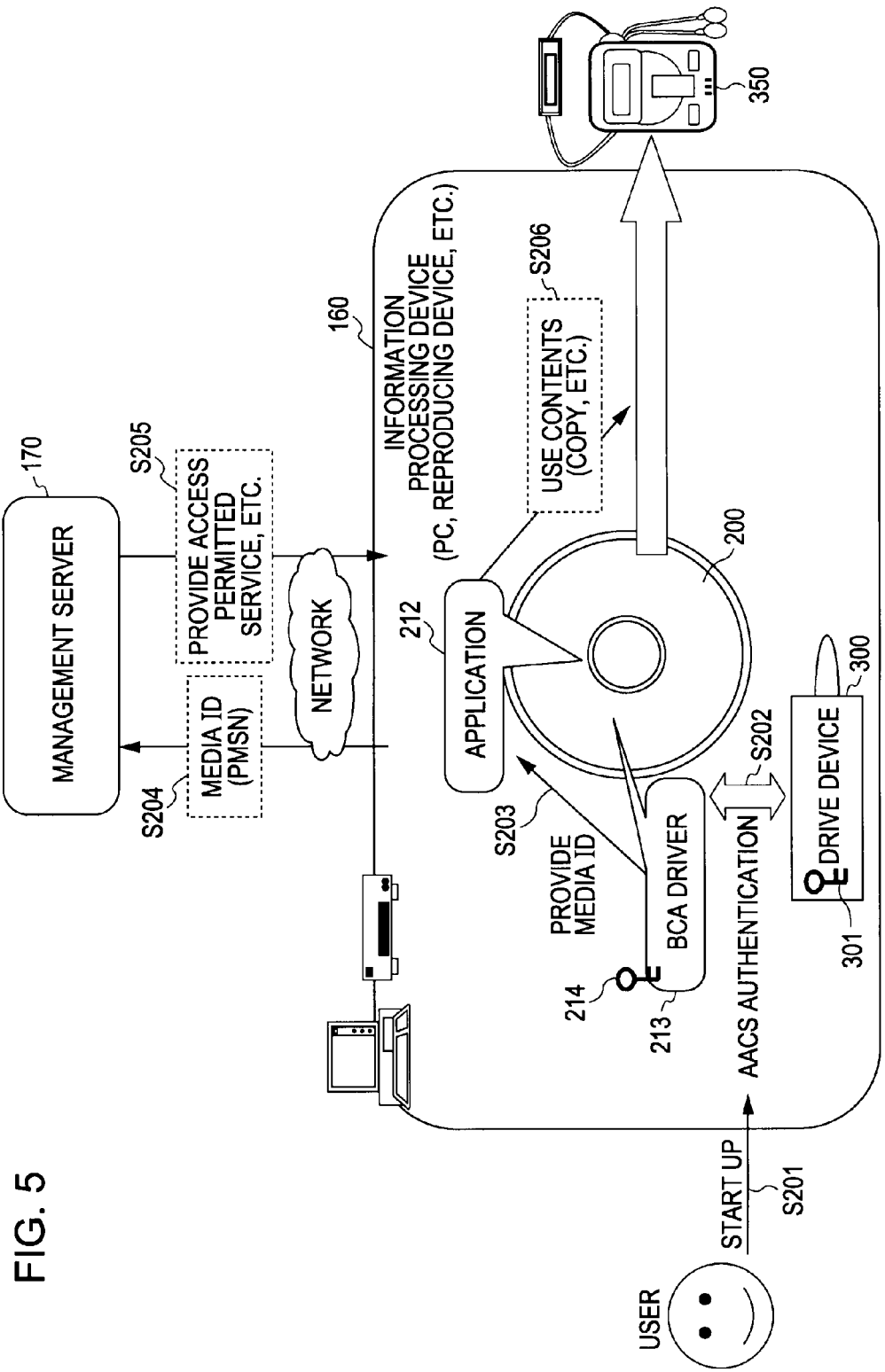
FIG. 5 is a view that illustrates reading of a media ID recorded in a disc, and an access processing sequence.

Next, a processing sequence in which contents recorded in the disc 200 are copied to another device, such as a hard disk of the information processing device or an external portable device, will be described with reference to FIG. 5.

The user, in step S201, starts up the information processing device 160, such as a PC or a reproducing device, in which the disc 200 is set, and runs the application 212 that executes a process of reproducing contents or a process of copying contents. After that, as the user inputs a copy request to the application 212, the application 212 requests the BCA driver 213 to acquire a media ID.

The BCA driver that has received the request for acquiring a media ID from the application 212 executes an authentication process with the drive device 300 in step S202. Note that the drive device 300 may be formed integrally with the information processing device 160 or may be formed separately and connected to the information processing device 160 via a USB cable, or the like. The authentication process in step S202 is executed in accordance with the AACS definition. The authentication process utilizes a secret key 214 included in the BCA driver 213 and a secret key 301 included in the drive device 300. The detail of the process will be described later.

As the validity of both the BCA driver 213 and the drive device 300 is verified through the authentication according to the AACS definition, the BCA driver 213 instructs the drive device 300 to read a media ID from the BCA area to thereby acquire the media ID. The BCA driver 213, in step S203, provides the media ID to the application 212.

The application 212, in step S204, transmits the media ID, received from the BCA driver 213, to the management server 170. The management server 170, in step S205, in response to the reception of the media ID, transmits access permission information, such as copy permission information, to the information processing device 160.

The application 212, in step S206, may copy the contents stored in the disc 200 to an external device 350 conditionally on the reception of the copy permission information from the management server 170.

Figure 6:
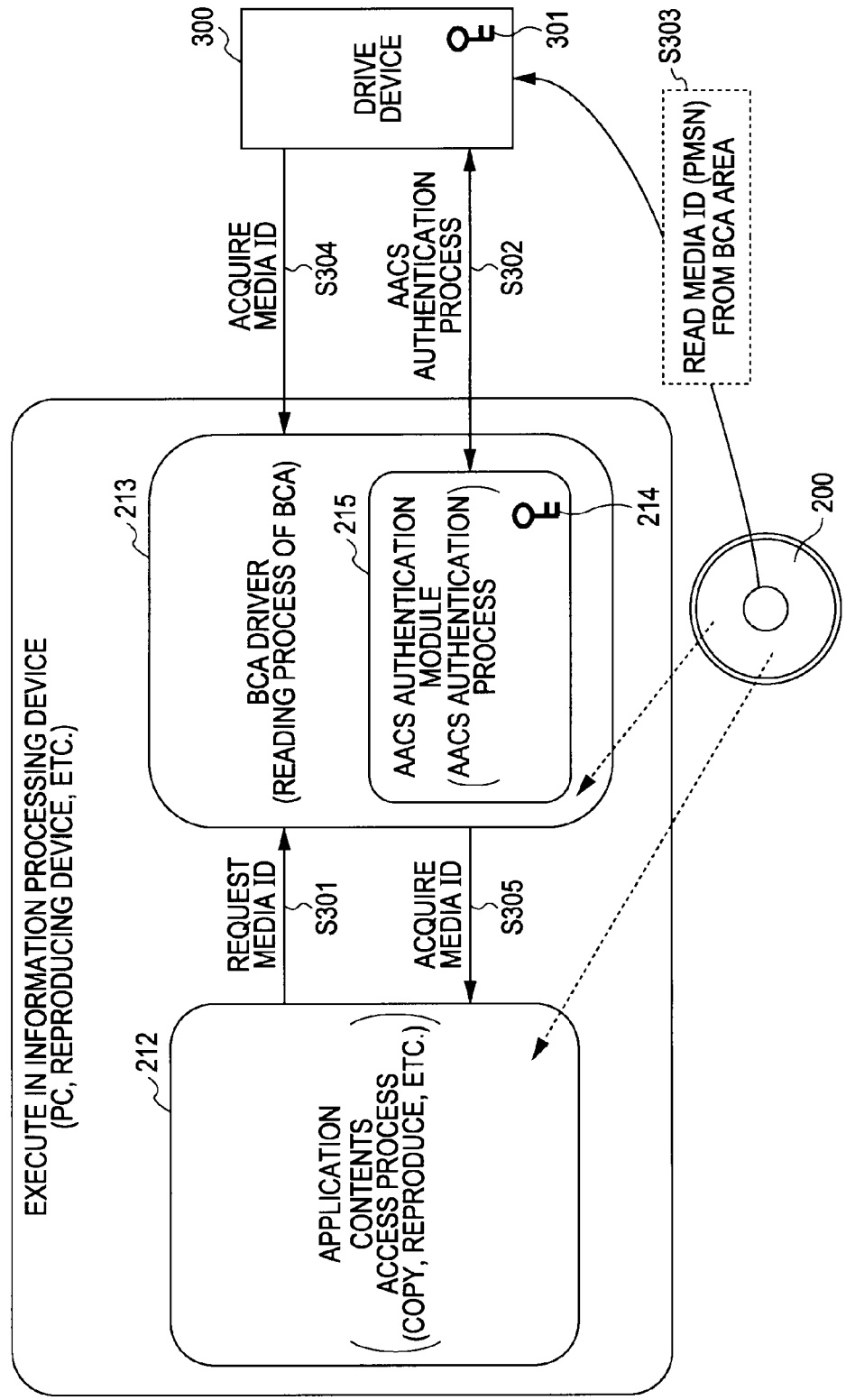
FIG. 6 is a view that illustrates a processing sequence of reading a media ID recorded in a disc.

When a series of processes in which the application acquires a media ID from the BCA driver are simply described in the sequence shown in FIG. 6. FIG. 6 shows (1) application 212, (2) BCA driver 213, and (3) drive device 300. The application 212 and the BCA driver 213 are executed on the information processing device, such as a PC or a reproducing device. The BCA driver 213 includes an AACS authentication module 215 that executes an authentication process according to the AACS definition, and further includes the secret key 214 used in the authentication process. The drive device 300 also includes the secret key 301 used in the authentication process.

In step S301, the application 212 requests the BCA driver 213 for a media ID. Next, in step S302, the BCA driver 213 executes the authentication process with the drive device 300 using the AACS authentication module. The above authentication process is executed in the sequence according to the AACS definition.

When it is not authenticated, the process is interrupted at this point. When it is authenticated and the validity of both the BCA driver 213 and the drive device 300 is verified, next, in step S303, the drive device 300 reads a media ID from the BCA area of the disc 200, and in step S304, provides the read media ID to the BCA driver 213. The BCA driver 213, in step S305, provides the media ID to the application 212.

Next, a process sequence between the application and the BCA driver according to the embodiment of the invention, that is, a sequence in which, in response to the request from the application, the BCA driver acquires a media ID and provides the media ID to the application, will be described with reference to FIG. 7.

Figure 7:
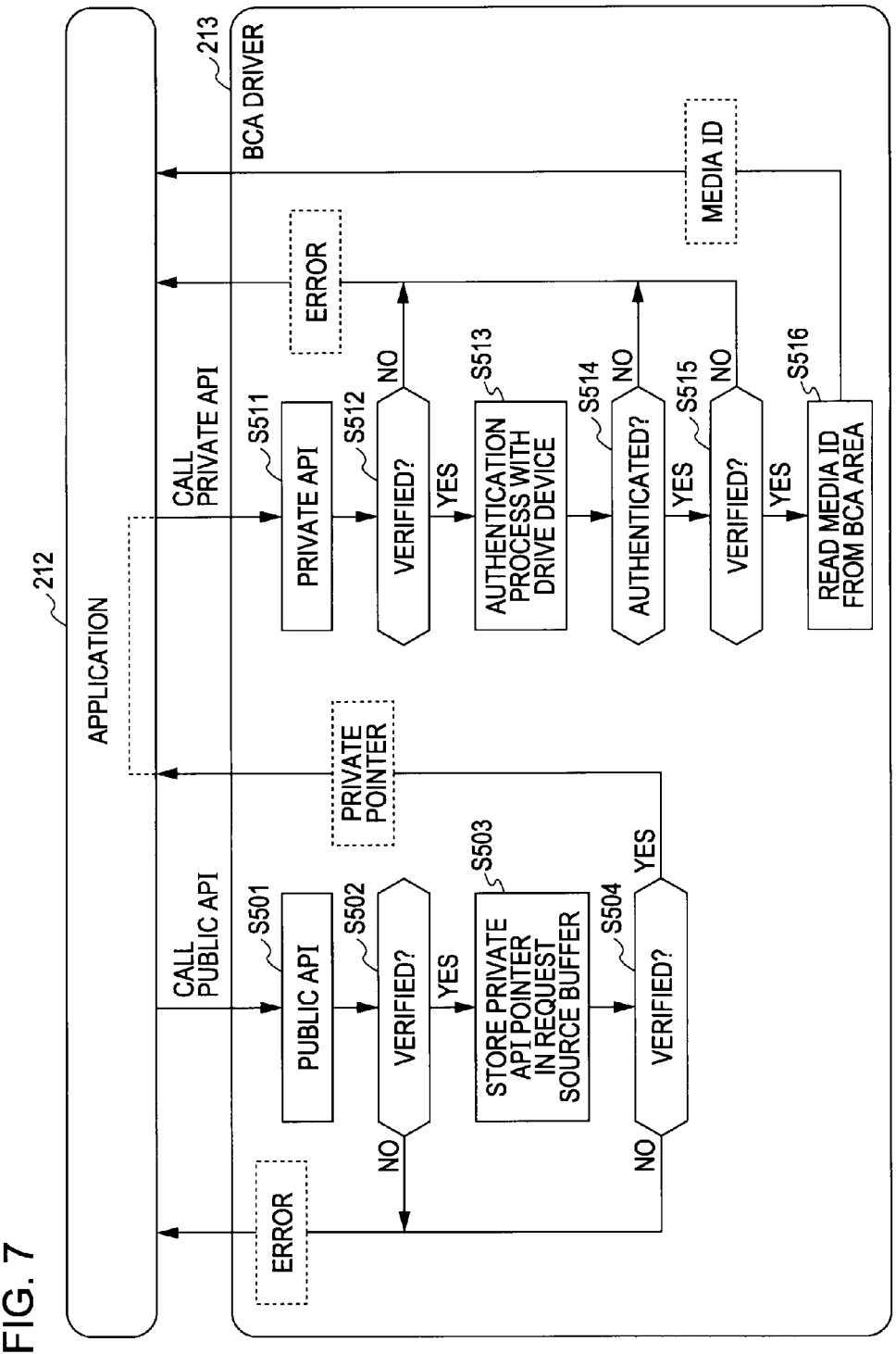
FIG. 7 is a view that illustrates a processing sequence between the application and the BCA driver according to the embodiment of the invention.

FIG. 7 shows the application 212 and the BCA driver 213. The information processing device, such as a PC or a reproducing device, that reproduces a disc reads the application 212 and the BCA driver 213 from the disc 200 and executes them in a program executing unit, such as a CPU.

That is, the application 212 and the BCA driver 213 are executed on an information processing device that includes a drive device in which a disc is loaded or on an information processing device connected to a drive device via, for example, a USB cable. Specifically, the application 212 is executed in an application executing unit of the information processing device, and the BCA driver 213 is executed in a BCA executing unit of the information processing device.

As described above, the process of reading the media ID (PMSN) from the BCA area of the disc is executable by the BCA driver according to the AACS definition. The BCA driver executes mutual authentication with the drive device loaded with the disc in accordance with the AACS definition, checks the validity of both the drive device and the BCA driver, reads the media ID, and then provides the media ID to the application.

Note that the BCA driver 213 is a program that is generated in accordance with the AACS definition, and executes an authentication process according to the AACS definition and reading of a media ID from the BCA area. On the other hand, the application 212 is a program that may be created by a third party at will. Thus, the application 112 may possibly be a malicious program, such as a program that is generated to fraudulently acquire media ID information.

The application 212 calls an API (Application Programming Interface) to the BCA driver 213. The API is public and is available to a third party.

The public API does not include functions for requesting the BCA driver to acquire a media ID but includes functions for requesting the BCA driver to acquire a pointer to a private API. In the configuration of the embodiment of the invention, the API that instructs the BCA driver to acquire a media ID is set as a private API.

That is, in the configuration of the embodiment of the invention, only the API for acquiring a pointer is public, and this public API is available to a third party that creates the application; however, the API that instructs the BCA driver to acquire a media ID is set as a private API. Thus, a third party is not able to create an application that calls a private API.

As the application 212 executes a process of calling a public API, the BCA driver 213, in step S501, in response to the API call from the application 212, initiates a series of processes in accordance with the public API.

First, in step S502, a process of verifying the BCA driver itself is executed using the verification data set in the BCA driver.

Figure 8:
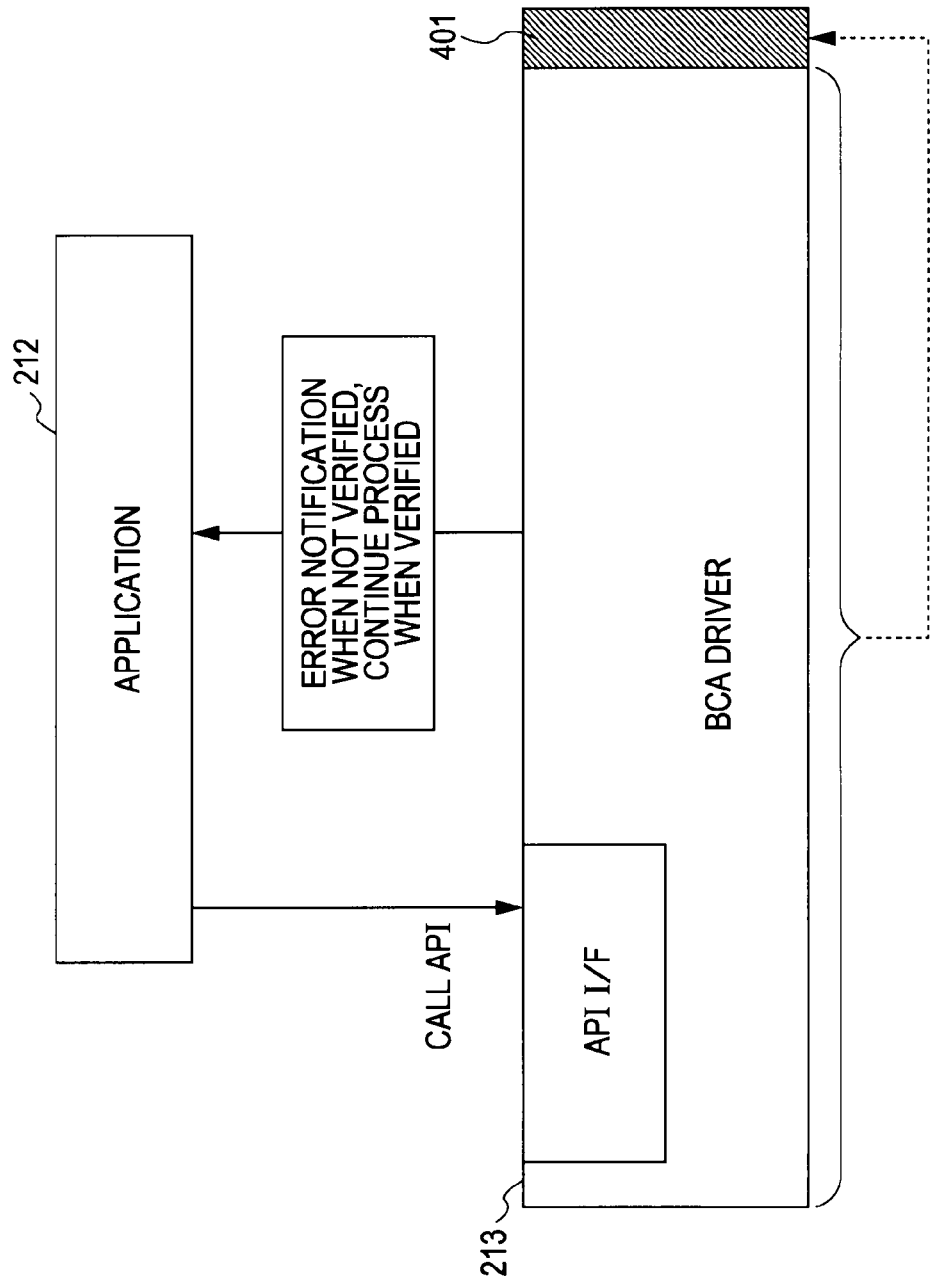
FIG. 8 is a view that illustrates the setting configuration of tampering check data of the BCA driver according to the embodiment of the invention.

FIG. 8 shows an example of the BCA driver 213 recorded in the disc 200 in accordance with the configuration according to the embodiment of the invention. As shown in FIG. 8, tampering check data (checksum) 401 for all data of the BCA driver are set in advance in the BCA driver 213. The tampering check data (checksum) 401 are set as a total value that is obtained by, for example, adding up data byte by byte as numeric values from the starting address of an image of the BCA driver.

In step S502 in the flow shown in FIG. 7, the verification data (for example, tampering check data (checksum) 401 shown in FIG. 8) set in the BCA driver are used to execute a verification process for the BCA driver itself. The detailed sequence of the verification process will be described with reference to the flowchart shown in FIG. 9.

Figure 9:
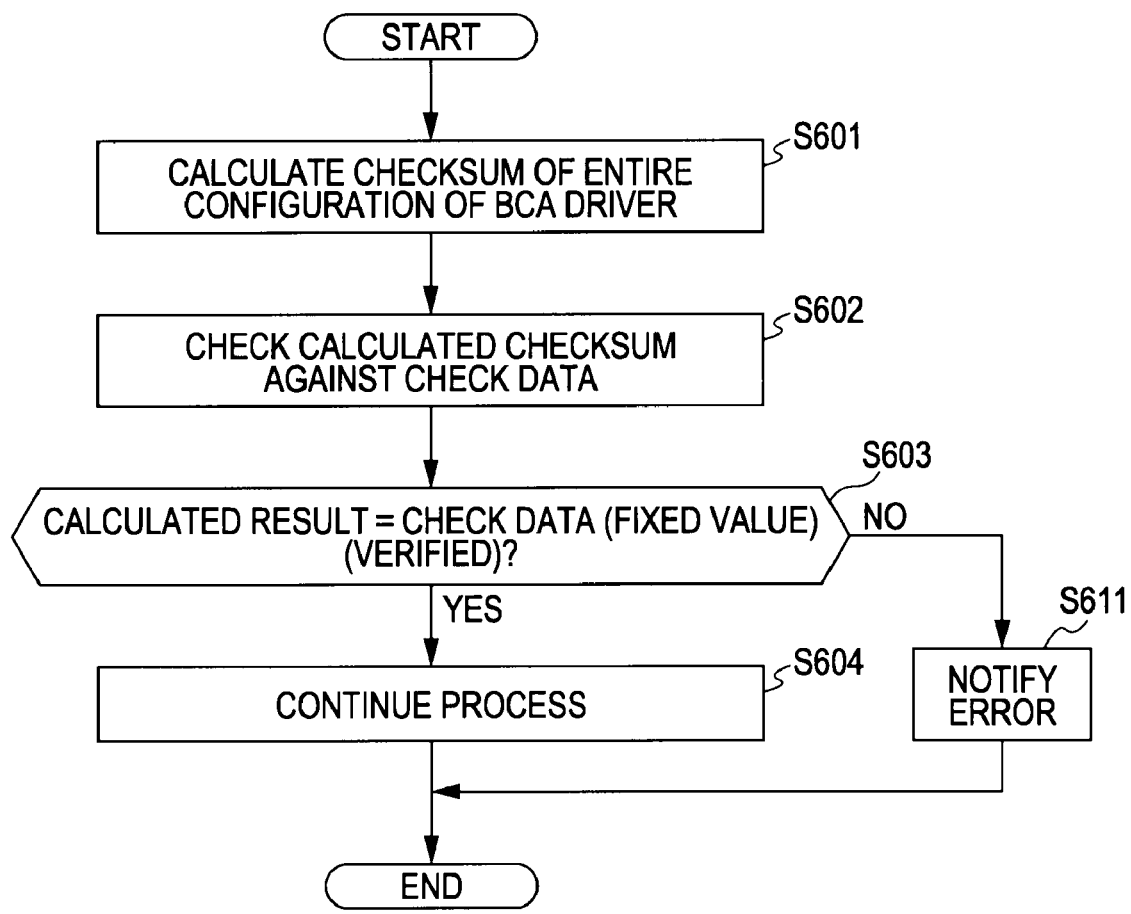
FIG. 9 is a view that illustrates a tampering check sequence of the BCA driver according to the embodiment of the invention.

The process shown in the flowchart of FIG. 9 is a sequence in which the BCA driver executes tampering check on the BCA driver itself. First, in step S601, the checksum of all the configuration of the BCA driver is calculated. For example, a total value that is obtained by adding up data byte by byte as numeric values from the starting address of an image of the BCA driver is calculated.

Next, in step S602, the calculated checksum is checked against the verification data. The verification data are the tampering check data (checksum) 401 shown in FIG. 8. In step S603, it is determined whether it is satisfied that the calculated result is equal to the verification data (fixed value). If it is satisfied, verification has been done, that is, it is determined that there is no tampering, and the process proceeds to step S604, after which the process continues. On the other hand, if it is not satisfied that the calculated result is equal to the verification data (fixed value), verification ends in failure, that is, it is determined that there is tampering, and the process proceeds to step S611, after which the process is interrupted and an error notice is provided to the application.

Referring back to FIG. 7, description of the processing sequence between the application and the BCA driver will be continued. In step S502, the tampering check described with reference to FIG. 9 is executed on the BCA driver, and if it is determined that there is tampering, the process is interrupted and an error notice is provided to the application. If it is determined that there is no tampering, the process proceeds to step S503.

In step S503, a private API pointer, that is, an API pointer that specifies a function for executing a process of reading a media ID from the BCA area of the disc, is stored in a buffer to which the application is accessible (request source buffer). Furthermore, in step S504, the BCA driver executes tampering check on the BCA driver, that is, the process similar to step S502 and described with reference to FIG. 9. In the present embodiment, the BCA driver is configured to execute tampering check on the BCA driver, described with reference to FIG. 9, each time a process is executed. In this way, by sequentially determining continuation or interruption of the process by executing tampering check, it is possible to protect against various attacks from the outside.

In the verification process in step S504, if it is determined that there is tampering, the process is interrupted, and an error notice is provided to the application. If it is determined that there is no tampering, the private API pointer is provided to the application 212 through the buffer.

The application 212 uses the private API pointer received from the BCA driver through the buffer to call the private API. The BCA driver 213, in step S511, initiates a process according to the private API. The private API is applied to the process of acquiring a media ID.

Furthermore, the BCA driver 213, in step S512, executes tampering check on the BCA driver, that is, the process similar to step S502 and described with reference to FIG. 9. In the verification process in step S512, if it is determined that there is tampering, the process is interrupted, and an error notice is provided to the application. If it is determined that there is no tampering, the process proceeds to step S513, and an authentication process with the drive device that reads data from the disc is executed to thereby check the validity of both the drive device and the BCA driver. The authentication process is executed, for example, in accordance with the AACS definition.

If authentication ends in failure in step S514, that is, if the validity of at least any one of the drive device and the BCA driver is not verified, an error notice is provided to the application 212, after which the process ends without reading a media ID.

On the other hand, if authentication is done in step S514 and the validity of both the drive device and the BCA driver is verified, the BCA driver 213, in step S515, further executes tampering check on the BCA driver, that is, a process similar to step S502 and described with reference to FIG. 9. In the verification process in step S515, if it is determined that there is tampering, the process is interrupted, and an error notice is provided to the application. If it is determined that there is no tampering, the process proceeds to step S516 and instructs the drive device to read a media ID from the BCA area and, then, the read media ID is provided to the application 212.

After that, the application 212 transmits the media ID acquired from the BCA driver 213 to the management server, and then receives contents copy permission information or other service information.

As shown in FIG. 7, the BCA driver executes tampering check on the BCA driver, described with reference to FIG. 9, each time a process is executed. In this way, by sequentially determining continuation or interruption of the process by executing tampering check, it is possible to protect against various attacks from the outside. As shown in FIG. 9, tampering check data (checksum) 401 for all data of the BCA driver are set in advance in the BCA driver 213. The BCA driver sequentially executes tampering check using the above data.

By repeatedly executing the tampering check, it is possible to, for example, check a patching attack or modification of a code, and it is also possible to check soft break (Int3), which is a hacking program used by many hackers. In addition, it is possible to effectively protect against injection (malicious code injection), or the like.

Note that as shown in FIG. 8, the verification data are recorded with the BCA driver as attached data, and in order to avoid modification of the checksum portion, it is desirable to embed a checksum with an exclusive tool for generating the BCA driver. In addition, the verification data (checksum) are not limited to the configuration that the data are set as a total value that is obtained by adding up data byte by byte as numeric values from the starting address of an image of the BCA driver. For example, the verification data may be set on the basis of core data not on the basis of the entire BCA driver.

Figure 10:
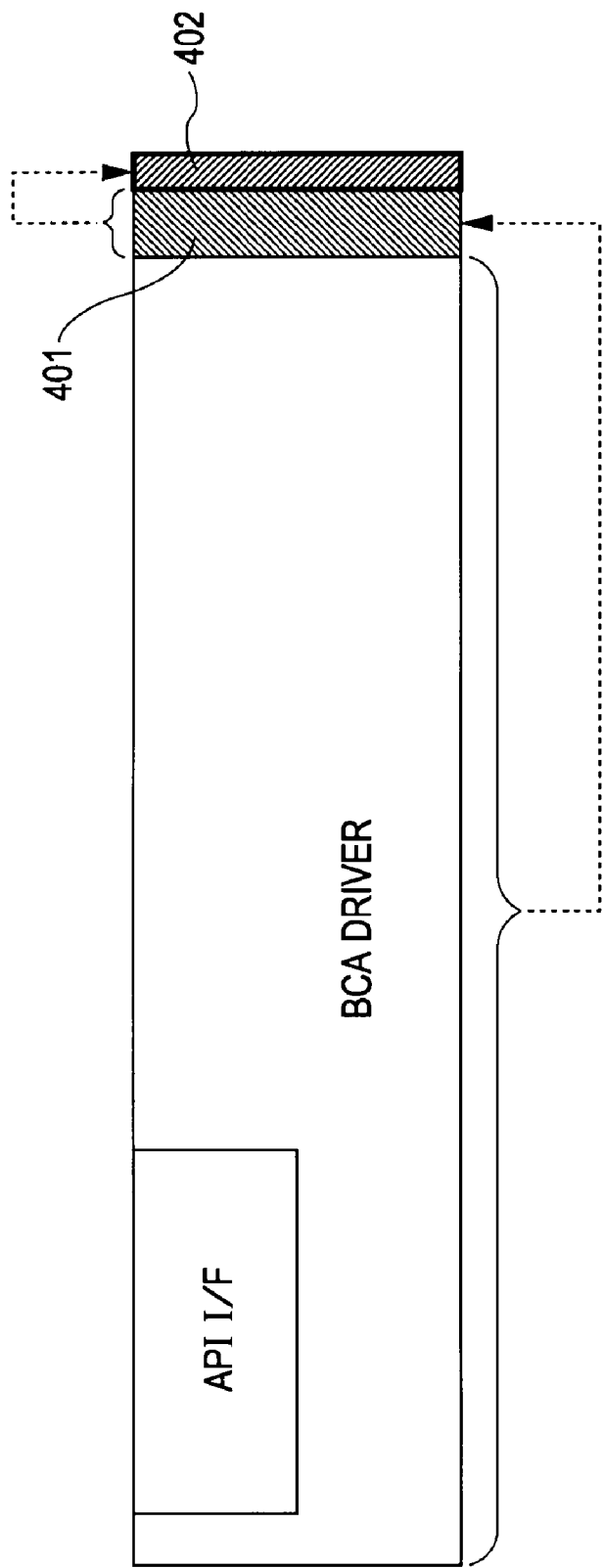
FIG. 10 is a view that illustrates the setting configuration of tampering check data of the BCA driver according to the embodiment of the invention.

Furthermore, it may be configured to set a hash value for detecting tampering of the verification data itself. For example, as shown in FIG. 10, a verification data hash value 402 based on the verification data 401 is generated and recorded as data attached to the BCA driver 213.

With the above configuration, in the process of verifying the BCA driver, such as step S502 of FIG. 7, tampering verification of the verification data 401 itself is executed using the verification data hash value 402 in addition to tampering check of the BCA driver using the verification data 401.

Note that as described with reference to FIG. 7, in the configuration of the embodiment of the invention, the application uses a public API to make it possible to execute a process of acquiring a pointer to a private API, and the application uses the acquired private API pointer to instruct the BCA driver to acquire a media ID. Furthermore, for the private API pointer, it may be configured not to provide only one pointer to the application but to provide data mixing one right pointer and dummy pointers to the application.

An example of a configuration of the pointer data is shown in FIG. 11. For example, as shown in FIG. 11, previously generated data mixing dummy pointers and a right pointer is provided to the application. That is, PVOID Dummy1[n] and PVOID Dummy2[n'] are dummy pointers, and PVOID pGet-BCAID is a right pointer. n and n' in the dummy pointers are numeric data. The private API has a structure such that a right pointer is sandwiched between dummy pointers as shown in FIG. 11, and the sandwich structure is also private. Thus, it is possible to further protect against various attacks to the BCA driver.

The application may be necessary to select a right pointer from among these plurality of pointers. For example, pointer selection information or a pointer selection tool is provided to only a previously authorized application creator. Thus, it is possible to effectively exclude pointer acquisition that uses a malicious application.

Figure 12:
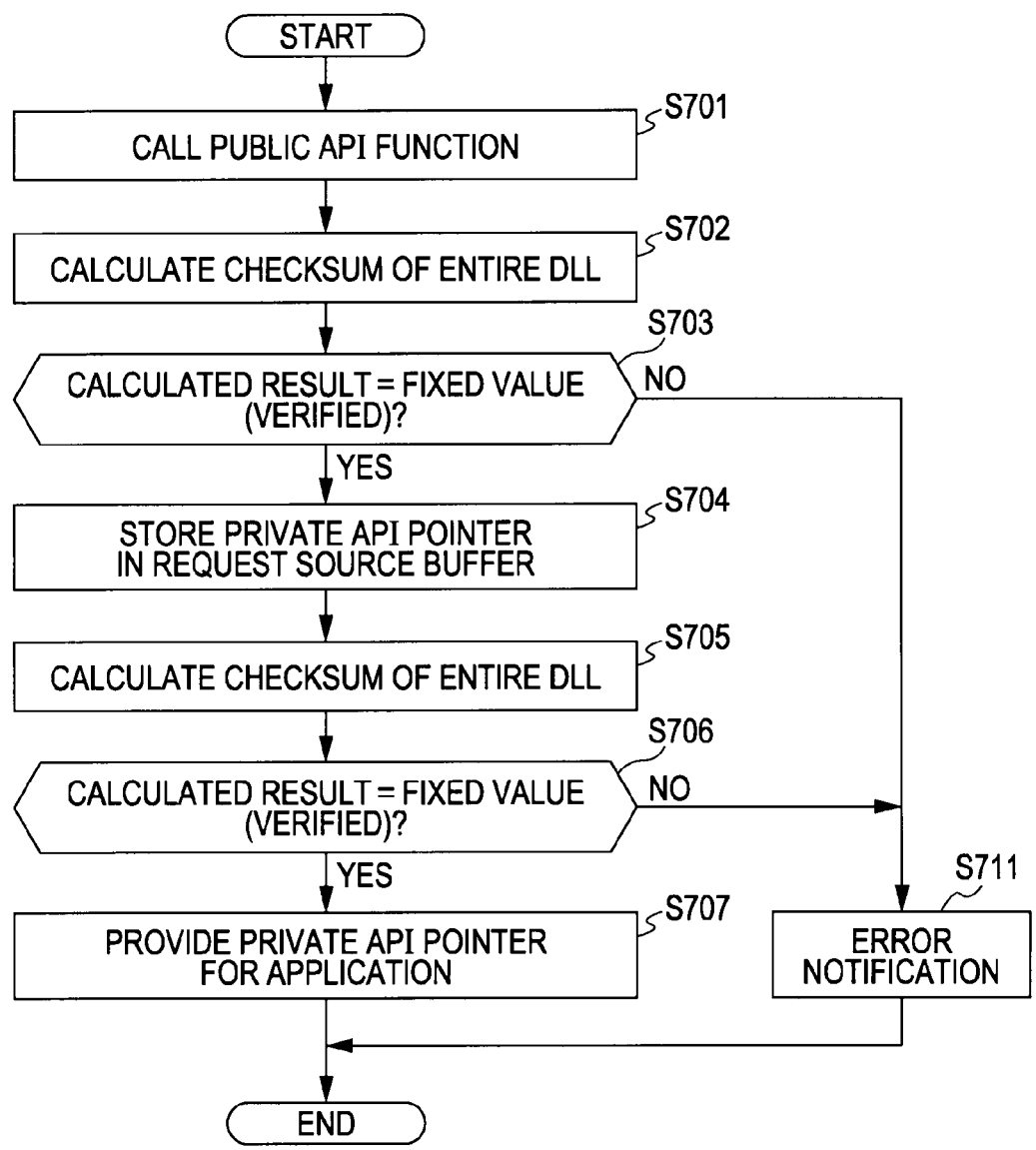
FIG. 12 is a flowchart that illustrates a processing sequence between the application and the BCA driver according to the embodiment of the invention.

FIG. 12 is a flow that illustrates a main processing sequence of the application and BCA driver according to the embodiment of the invention. The sequence is a flow that illustrates the process of steps S501 to S504 in the flow of FIG. 7 in greater detail.

First, in step S701, the application calls a public API function. The public API is an API for acquiring a pointer to the private API. Next, in step S702, a tampering check process is executed on the BCA driver. Specifically, the checksum of the entire DLL (Dynamic Linking Library) corresponding to the BCA driver is calculated. That is, the verification data (for example, tampering check data (checksum) 401 shown in FIG. 8) set in the BCA driver are used to execute a verification process on the BCA driver itself.

That is, the checksum of the entire configuration of the BCA driver is calculated. For example, a total value that is obtained by adding up data byte by byte as numeric values from the starting address of an image of the BCA driver is calculated, and in step S703, the calculated checksum is checked against the verification data. The verification data are the tampering check data (checksum) 401 shown in FIG. 8. In step S703, if it is satisfied that the calculated result is equal to the verification data (fixed value), verification is done, that is, it is determined that there is no tampering, and the process proceeds to step S704, after which the process continues. On the other hand, if it is not satisfied that the calculated result is equal to the verification data (fixed value), verification ends in failure, that is, it is determined that there is tampering, and the process proceeds to step S711, after which the process is interrupted and an error notice is provided to the application.

In step S704, a private API pointer, that is, an API pointer that specifies a function for executing a process of reading a media ID from the BCA area of the disc, is stored in a buffer to which the application is accessible (request source buffer). Furthermore, in step S705, the BCA driver calculates the checksum of the entire DLL corresponding to the BCA driver. That is, the verification data (for example, tampering check data (checksum) 401 shown in FIG. 8) set in the BCA driver are used to execute a verification process on the BCA driver itself.

In step S706, if it is determined that there is tampering in the BCA driver, the process proceeds to step S711 and is interrupted, after which an error notice is provided to the application. If it is determined that there is no tampering, the process proceeds to step S707. In step S707, the private API pointer is provided to the application 212 through the buffer.

The application 212 uses the private API pointer received from the BCA driver through the buffer to call the private API. The following process will be the process following step S511 of FIG. 7.

As described above, in the configuration of the embodiment of the invention, an API for executing a process of acquiring a media ID is set as a private API, and a public API to which the application is accessible is set as a pointer to the private API for executing the process of acquiring the media ID, and when the public API is called, the BCA driver execute tampering check on the BCA driver prior to the steps of executing the processes.

With the above configuration, for example, if a malicious application calls a public API to intend to acquire a media ID from the BCA driver, when the malicious application variously attacks the BCA driver, that is, tampers the BCA driver, before a private API is acquired, the BCA driver is able to detect tampering in the tampering check, immediately interrupt the process and stop providing the private API to the malicious application. Thus, it is possible to prevent the malicious application from fraudulently acquiring a media ID.

As described above, the embodiment of the invention is described in greater detail with reference to the specific example embodiment. It is obvious that a person skilled in the art may modify or replace the example embodiment without departing from the scope of the invention. That is, the invention described above is illustrative and should not be construed as restrictive. The scope of the invention should be determined with reference to the appended claims.

In addition, the series of processes described in the specification may be executed through hardware, software, or composite configuration of them. When the process is executed through software, it is possible to execute a program that contains the process sequence, which is installed or copied into a memory inside a computer assembled to exclusive hardware, or to execute the program which is installed or copied into a general-purpose computer that is able to execute various processes. For example, the program may be recorded in a recording medium in advance. The program may be not only installed or copied from a recording medium to the computer but also received through a network, such as a LAN (Local Area Network) or the Internet, and then installed or copied into a recording medium, such as an internal hard disk. Note that the file format of the BCA driver described in the above embodiment is not limited to a DLL file; it may be a format, such as an EXE file.

Note that various processes described in the specification are not limited to that they are executed in time sequence in accordance with the description; they may be executed parallel or separately depending on the performance of a device that executes the processes or where necessary. In addition, the system in the present specification is a logically integrated configuration of a plurality of devices, and is not limited to the one that a device of each configuration is placed in the same casing.

What is claimed is:

1. An information processing device that uses contents recorded in a disc, comprising:
a processor that
executes an application, which is a program for utilizing the contents recorded in the disc;
executes a BCA (Burst Cutting Area) driver, which is a program for instructing a drive device to execute a process of reading a media ID recorded in a BCA area of the disc; and
executes, in response to a first API (Application Programming Interface) call from the application, a tampering check process on the BCA driver, and, when it is verified that there is no tampering in the BCA driver, executes a process of providing the application with a pointer to a second API for executing a process of reading a media ID.

2. The information processing device according to claim 1, wherein the first API is a public API that is public to a third party, and the second API is a private API that is not public to the third party.

3. The information processing device according to claim 1, wherein the processor executes, in response to a second API call from the application, an authentication process with the drive device, and when it is verified that the mutual validity of the BCA driver and the drive device, instructs the drive device to read the media ID.

4. The information processing device according to claim 3, wherein the processor executes, in response to a second API call from the application, a tampering check process on the BCA driver, and when it is verified that there is no tampering in the BCA driver, executes an authentication process with the drive device.

5. The information processing device according to claim 1, wherein the processor executes a tampering check process on the BCA driver each time the BCA driver executes a step.

6. The information processing device according to claim 1, wherein the processor executes a process of providing the application with data mixing a pointer to the second API and a dummy pointer.

7. The information processing device according to claim 1, wherein the application and the BCA driver are recorded in the disc, and the processor respectively reads and executes the application and the BCA driver recorded in the disc.

8. An information processing device that utilizes contents recorded in a disc, comprising:
a processor that
executes an application, which is a program for utilizing the contents recorded in the disc;
executes a BCA (Burst Cutting Area) driver, which is a program for instructing a drive device to execute a process of reading a media ID recorded in a BCA area of the disc, wherein the BCA driver includes tampering check data; and
executes, in response to a first API (Application Programming Interface) call from the application, a tampering check process on the BCA driver by applying the tampering check data, and, when it is verified that there is no tampering in the BCA driver, executes a process of providing the application with a pointer to a second API for executing a process of reading a media ID.

9. An information processing device that utilizes contents recorded in a disc, comprising:
a processor that
executes an application, which is a program for utilizing the contents recorded in the disc;
executes a BCA (Burst Cutting Area) driver, which is a program for instructing a drive device to execute a process of reading a media ID recorded in a BCA (Burst Cutting Area) area of the disc, wherein the BCA driver includes checksum data, as tampering check data, that are obtained by adding numeric values of data that constitute the BCA driver in predetermined units of data; and
executes, in response to a first API (Application Programming Interface) call from the application, a tampering check process on the BCA driver by applying the checksum data, and, when it is verified that there is no tampering in the BCA driver, executes a process of providing the application with a pointer to a second API for executing a process of reading a media ID.

10. An information processing device that utilizes contents recorded in a disc, comprising:
a processor that
executes an application, which is a program for utilizing the contents recorded in the disc;
executes a BCA (Burst Cutting Area) driver, which is a program for instructing a drive device to execute a process of reading a media ID recorded in a BCA area of the disc, wherein the BCA driver includes tampering check data and a hash value for the tampering check data; and
executes, in response to a first API (Application Programming Interface) call from the application, a tampering check process on the BCA driver by applying the tampering check data and executes a tampering check process on the tampering check data by applying the hash value, and, when it is verified that there is no tampering in the BCA driver and that there is no tampering in the tampering check data, executes a process of providing the application with a pointer to a second API for executing a process of reading a media ID.

11. An information processing method executed in an information processing device that utilizes contents recorded in a disc, comprising:
executing an application, which is a program for utilizing the contents recorded in the disc, by a processor of the information processing device; and
executing a BCA (Burst Cutting Area) driver, which is a program for instructing a drive device to execute a process of reading a media ID recorded in a BCA area provided in the disc, by the processor, wherein
when the BCA driver is executed, in response to a first API (Application Programming Interface) call from the application, a tampering check process is executed on the BCA driver, and wherein when it is verified that there is no tampering in the BCA driver, a process of providing the application with a pointer to a second API for executing a process of reading the media ID is executed.

12. The information processing method according to claim 11, wherein the first API is a public API that is public to a third party, and the second API is a private API that is not public to the third party.

13. The information processing method according to claim 11, wherein when the BCA driver is executed, in response to a second API call from the application, an authentication process is executed with the drive device, and when it is verified that the mutual validity of the BCA driver and the drive device, the drive device is instructed to read the media ID.

14. The information processing method according to claim 13, wherein when the BCA driver is executed, in response to a second API call from the application, a tampering check process is executed on the BCA driver, and when it is verified that there is no tampering in the BCA driver, an authentication process is executed with the drive device.

15. The information processing method according to claim 11, wherein when the BCA driver is executed, a tampering check process is executed on the BCA driver each time the BCA driver executes a step.

16. The information processing method according to claim 11, wherein when the BCA driver is executed, a process of providing the application with data mixing a pointer to the second API and a dummy pointer is executed.

17. An information processing method that is executed in an information processing device that utilizes contents recorded in a disc, comprising:
   executing an application, which is a program for utilizing the contents recorded in the disc, by a processor of the information processing device; and
   executing a BCA (Burst Cutting Area) driver, which is a program for instructing a drive device to execute a process of reading a media ID recorded in a BCA area of the disc, by the processor, wherein the BCA driver includes tampering check data, wherein
   when the BCA driver is executed, in response to a first API (Application Programming Interface) call from the application, a tampering check process is executed on the BCA driver by applying the tampering check data, and, when it is verified that there is no tampering in the BCA driver, a process of providing the application with a pointer to a second API for executing a process of reading a media ID is executed.

18. An information processing method that is executed in an information processing device that utilizes contents recorded in a disc, comprising:
   executing an application, which is a program for utilizing the contents recorded in the disc, by a processor of the information processing device; and
   executing a BCA (Burst Cutting Area) driver, which is a program for instructing a drive device to execute a process of reading a media ID recorded in a BCA area of the disc, by the processor, wherein the BCA driver includes checksum data, as tampering check data, that are obtained by adding numeric values of data that constitute the BCA driver in predetermined units of data, wherein
   when the BCA driver is executed, in response to a first API (Application Programming Interface) call from the application, a tampering check process is executed on the BCA driver by applying the checksum data, and, when it is verified that there is no tampering in the BCA driver, a process of providing the application with a pointer to a second API for executing a process of reading a media ID is executed.

19. An information processing method that is executed in an information processing device that utilizes contents recorded in a disc, comprising:
   executing an application, which is a program for utilizing the contents recorded in the disc, by a processor of the information processing device; and
   executing a BCA (Burst Cutting Area) driver, which is a program for instructing a drive device to execute a process of reading a media ID recorded in a BCA (Burst Cutting Area) area of the disc, by the processor, wherein the BCA driver includes tampering check data and a hash value for the tampering check data, wherein
   when the BCA driver is executed, in response to a first API (Application Programming Interface) call from the application, a tampering check process is executed on the BCA driver by applying the tampering check data and a tampering check process is executed on the tampering check data by applying the hash value, and, when it is verified that there is no tampering in the BCA driver and that there is no tampering in the tampering check data, a process of providing the application with a pointer to a second API for executing a process of reading a media ID is executed.

20. A non-transitory storage medium storing a program which when executed by a processor causes the processor to perform a method for executing information processing in an information processing device that utilizes contents recorded in a disc, the method comprising:
   executing an application, which is a program for utilizing the contents recorded in the disc, by an application execution unit; and
   executing a BCA (Burst Cutting Area) driver, which is a program for instructing a drive device to execute a process of reading a media ID recorded in a BCA area provided in the disc, by an BCA driver execution unit, wherein
   when the BCA driver is executed, in response to a first API (Application Programming Interface) call from the application execution unit, a tampering check process is executed on the BCA driver, and when it is verified that there is no tampering in the BCA driver, a process of providing the application execution unit with a pointer to a second API for executing a process of reading the media ID is executed.

* * * * *